No. 827,817.
PATENTED AUG. 7, 1906.
P. PECK.
SPECTACLE TEMPLE.
APPLICATION FILED FEB. 21, 1906.
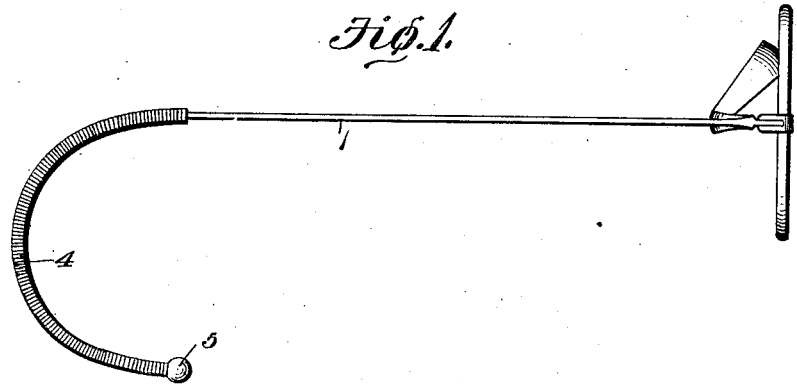
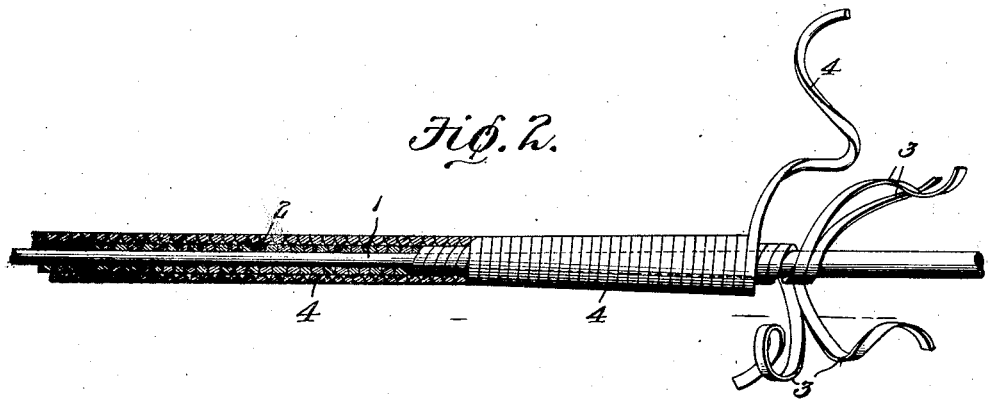
WITNESSES:
Peter Peck,
INVENTOR
ATTORNEYS

UNITED STATES PATENT OFFICE.

PETER PECK, OF SOUTHBRIDGE, MASSACHUSETTS, ASSIGNOR TO CENTRAL OPTICAL COMPANY, OF SOUTHBRIDGE, MASSACHUSETTS, A CORPORATION OF MAINE.

SPECTACLE-TEMPLE.

No. 827,817.

Specification of Letters Patent.

Patented Aug. 7, 1906.

Application filed February 21, 1906. Serial No. 302,291.

*To all whom it may concern:*

Be it known that I, PETER PECK, a citizen of the United States, residing at Southbridge, in the county of Worcester and State of Massachusetts, have invented a new and useful Spectacle-Temple, of which the following is a specification.

This invention relates to spectacle-temples, and has for its object to provide certain new and useful improvements in the riding-temple, whereby the diameter of the latter is increased so as to have a relatively broad bearing around the ears of the wearer, thereby to overcome the annoyance of a thin riding-temple and to avoid stiffness of the riding-temple by reason of its increased diameter and to maintain the desired resiliency for convenience in applying the temple and removing the same from the ears of the wearer.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of a spectacle-temple embodying the features of the present invention. Fig. 2 is an enlarged fragmentary view of a portion of the temple, partly in elevation and partly in section, with the coiled elements thereof partly uncoiled.

Like characters of reference designate corresponding parts in both the figures of the drawings.

The temple-wire 1 is resilient and is shown in Fig. 2 as tapered rearwardly at its rear end portion. This tapered portion of the temple-wire is thrust snugly into a tube 2, which is formed of four strands of flat wire 3, which are tightly coiled to form a tube, the forward end of which is soldered, brazed, or otherwise rigidly connected to the temple. The wire strands 3 are pliable rather than elastic.

Around the wire tube is spirally wrapped a gold wire 4, which is soldered or brazed to the temple-wire at the forward end of the tube 2, the connection between the temple-wire and the five other wires being finished in such a manner as to avoid any sharp projections upon the temple. After the wire 4 has been wrapped upon the device to form a sheath therefor the wrapped portion of the temple is passed between suitable pressure-rolls, so as to flatten the outer portions of the coils and mash the sides of the coils snugly against one another so as to present a smooth substantially continuous outer surface upon the sheath. A suitable ball or knob 5 is soldered, brazed, or otherwise connected to the free end of the temple, so as to form the desired finish therefor. After the temple has been finished, so far as the outer wrapping 4 is concerned, the temple is straight, as indicated in Fig. 2, and then it is bent in any suitable manner into an approximately semicircular shape in the usual manner, the pliable inner tube 2 being strong enough to partially overcome the resiliency of the temple-wire and the external wrapping, so as to maintain the bowed shape given to the temple and at the same time to permit a reasonable degree of resiliency imparted thereto by the temple-wire and the outer wrapping.

Having thus described the invention, what is claimed is—

1. A spectacle-temple comprising a temple-wire, and a plurality of pliable wires wrapped in spiral form around the temple-wire and terminally secured thereto, the pliable wires being strong enough to partially overcome the resiliency of the temple-wire to hold the latter in shape when bent to form a substantially semicircular riding-temple.

2. A spectacle-temple comprising a resilient temple-wire, a spiral wrapping of pliable wire upon the temple-wire, and an external wrapping of non-corrosive wire embracing the pliable wire, the wrapped portions of the temple being bent into substantially semicircular form to constitute a riding-temple, and the pliable wire being strong enough to maintain the shape of the riding-temple without entirely overcoming the resiliency of the temple-wire.

3. A spectacle-temple comprising a resilient temple-wire, a wrapping thereon of pliable wire, and an external sheath of non-corrosive wire wrapped upon the pliable wire, the wrapped portion of the wire being bent into substantially semicircular form to constitute a riding-temple, the pliable wire being strong enough to partially overcome the resiliency of the temple-wire, and the wrapped portion of the device having its coils externally flattened to form a smooth outer surface.

In testimony that I claim the foregoing as my own I have hereto affixed my signature in the presence of two witnesses.

PETER PECK.

Witnesses:
J. F. LARIVIEN,
ALEX J. PAQUIN.